Aug. 19, 1969 A. J. COOPER 3,461,562
DENTAL RESTORATION DIE AND MODEL JIG
Filed Dec. 14, 1965 2 Sheets-Sheet 1
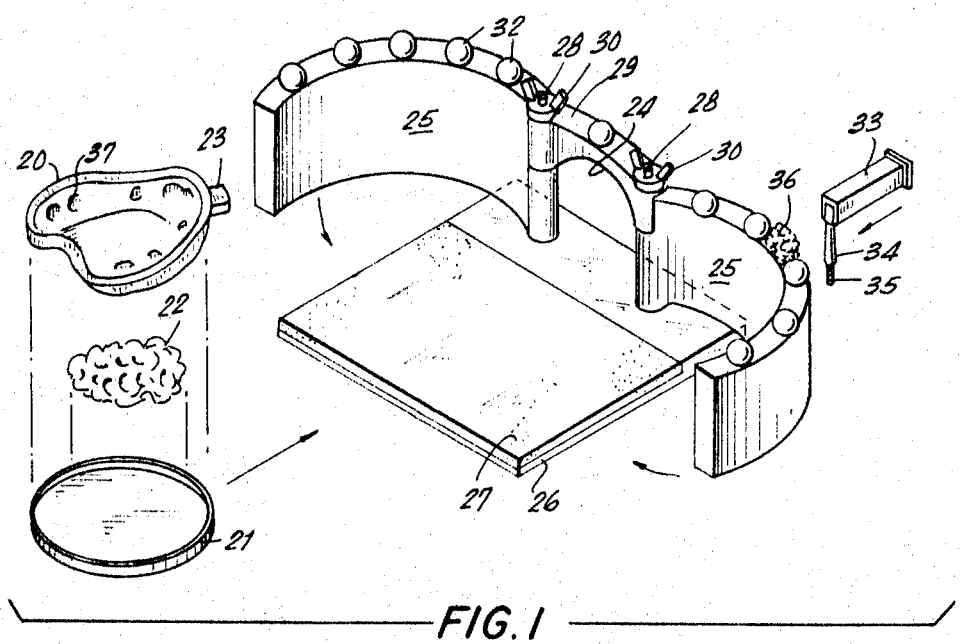
FIG. 1
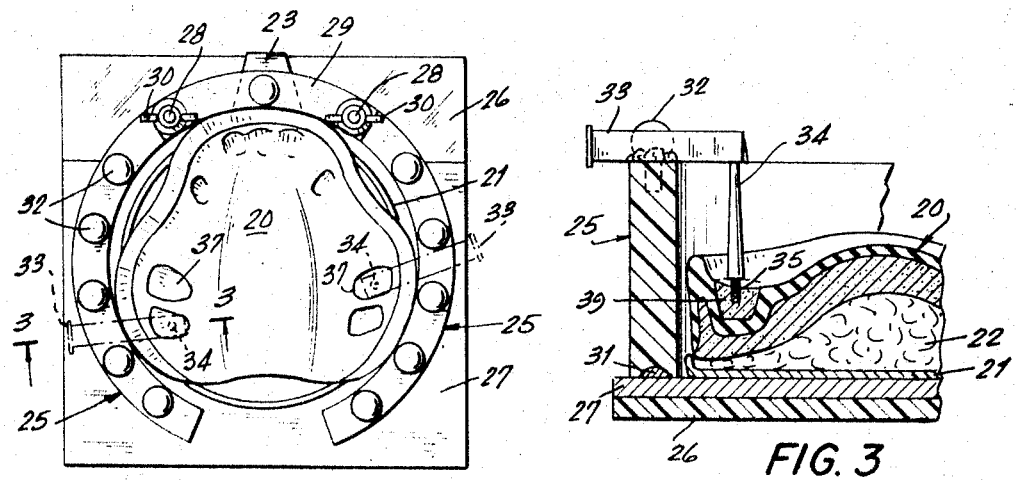
FIG. 2
FIG. 3
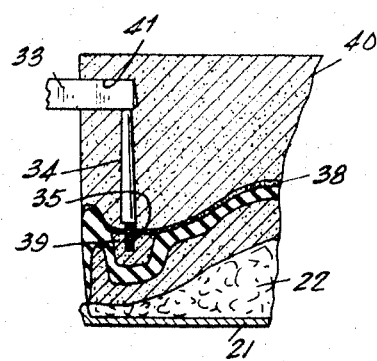
FIG. 4
INVENTOR.
ABRAHAM J. COOPER
BY
ATTORNEY Aug. 19, 1969    A. J. COOPER    3,461,562
DENTAL RESTORATION DIE AND MODEL JIG
Filed Dec. 14, 1965    2 Sheets-Sheet 2
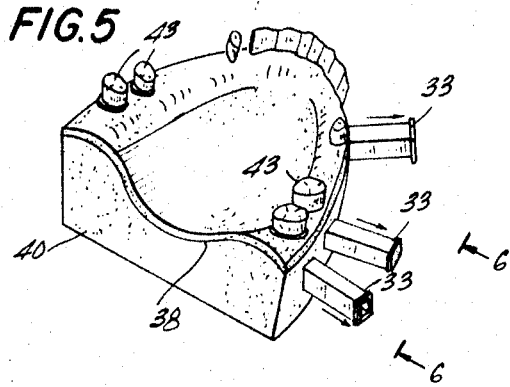
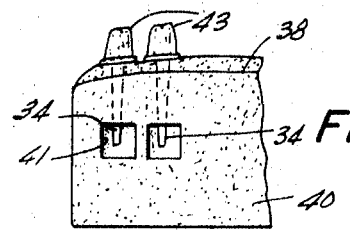
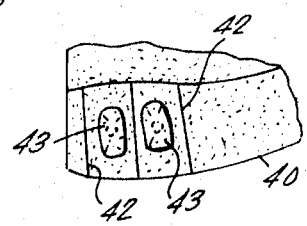
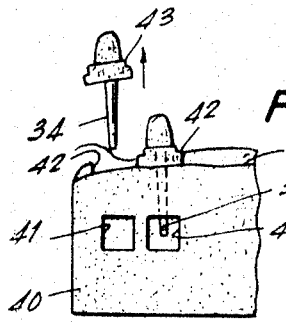
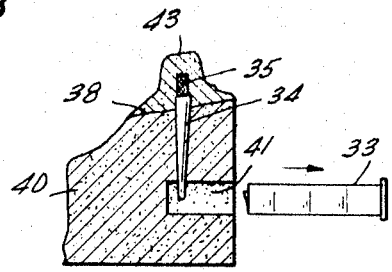
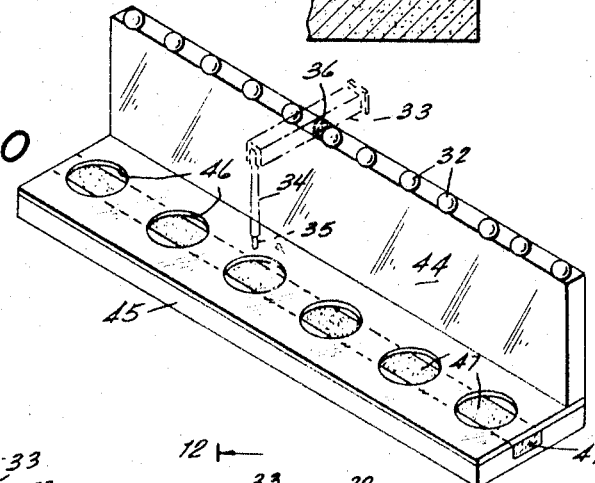
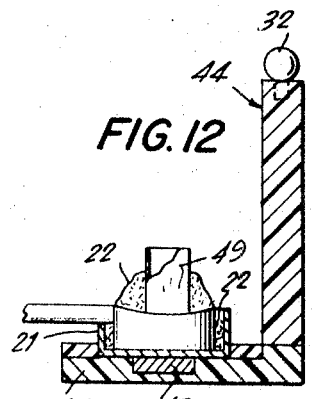
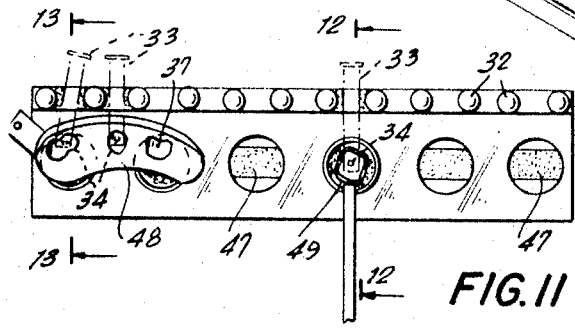
INVENTOR.
ABRAHAM J. COOPER
BY Albert H. Krosman
ATTORNEY United States Patent Office 3,461,562
Patented Aug. 19, 1969

3,461,562
DENTAL RESTORATION DIE AND MODEL JIG
Abraham J. Cooper, 1 DeKalb Ave.,
Brooklyn, N.Y. 11201
Filed Dec. 14, 1965, Ser. No. 513,732
Int. Cl. A61c 9/00
U.S. Cl. 32—40                                                                       4 Claims

ABSTRACT OF THE DISCLOSURE

A dental restoration die fabricating device in which the dental impression is carried within a cup of ferrous material, a magnetic member holds the cup to the base of the device and an upstanding wall supports dowels in an oriented position while a die forming material is poured around the dowels into the cavities in the impression.

---

This invention relates to the manufacture of dental restorations such as bridges, inlays, caps and the like. In the manufacture of dental restorations, it is important that the finished prosthetic devices correspond most accurately to the structure of the patient's adjacent teeth and gums. Since the restorations are manufactured in the laboratory at a distance from the patient, problems of alignment, fit, and accuracy are multiplied. While many devices have been employed for the purpose of improving the accuracy of such work, they have generally been less than satisfactory in view of the close tolerances necessary to insure comfort.

Heretofore the dentists took an impression of the prepared teeth of the patient by means of some resilient rubbery material which was forced into contact with the patient's teeth and gums. Thereafter, a die was made by pouring cast stone or plastic into the cavities of the impression and a further casting made to form a model of the teeth and gums. The impression was then peeled away from the model and dies. The model and dies were then employed by the dental technician or the dentist in constructing the restoration desired. In order to work around closely spaced teeth reproduced in the model, it is often important that individual teeth be removed from the model and thereafter replaced. Various pins and other devices have been employed for this purpose but the problems of accurately replacing the dies or teeth and matching the original registration have been greatly multiplied when the individual dies or teeth were removed.

Accordingly, it is an object of the present invention to provide a device which will greatly improve the manufacture of dental restorations.

Another object of the present invention is to provide a device which will enable a dental technician to make a plurality of dies at the same time.

Still another object of the present invention is to provide a device which enables a dental technician to form a model in which the dies or teeth may be removed and thereafter replaced with extreme accuracy.

A further object of the present invention is to reduce the time and therefore the cost of manufacturing dental restorations.

Another object of the present invention is to provide a device which will enable less skilled operators to make dental restorations.

A feature of the present invention is its use of a rack which facilitates the pouring of the model forming material and the placement of tooth locating members therein.

Another feature of the present invention is its use of a magnetic base for securing the impression in place during pouring operations.

Still another feature of the present invention is its use of a plurality of stations whereby several cavities may be filled simultaneously to form a model and die.

The invention consists of the construction, combination and arrangement of parts, as herein illustrated, described and claimed.

In the accompanying drawings, forming a part hereof are illustrated two forms of embodiment of the invention, in which drawings similar reference characters designate corresponding parts, and in which:

FIGURE 1 is a somewhat exploded view of a complete embodiment of a dental restoration model and jig according to the present invention.

FIGURE 2 is a top plan view of the jig shown in FIGURE 1, in the assembled state.

FIGURE 3 is a sectional view taken on line 3—3 of FIGURE 1, looking in the direction of the arrows.

FIGURE 4 is a view similar to FIGURE 3, showing a subsequent stage in the manufacture of the model and dies.

FIGURE 5 is a somewhat isometric view of the completed model after its separation from the dental impression.

FIGURE 6 is a sectional view taken on line 6—6 looking in the direction of the arrows.

FIGURE 7 is a top plan view of the portion of the model and dies shown in FIGURE 6.

FIGURE 8 is a view similar to FIGURE 6 showing the removal of one of the tooth elements.

FIGURE 9 is fragmentary view in vertical section of a portion of the die structure.

FIGURE 10 is a somewhat isometric view of a second embodiment of the present invention employing a straight jig.

FIGURE 11 is a top plan view of the jig shown in FIGURE 10, with certain dental elements placed therein.

FIGURE 12 is a vertical section through the jig in FIGURE 11, taken on line 12—12.

FIGURE 13 is a cross-sectional view taken on line 13—13 in FIGURE 11.

The invention consists broadly in providing a jig having an upstanding wall upon which there is supported one or more resilient members having dowels depending therefrom. The dental impression which is made by the dentist of the patient's mouth is placed adjacent the wall and the dowels extended downwardly into the cavities within the impression. Thereafter, the cast stone or plastic which is to form the die is poured into the cavtiies so that the dowels are anchored therein. A final pour of cast stone overlays the entire dental impression and forms the model or a base for the die. The resilient impression is thereafter stripped from the model and die and the finished model and die may serve for the purpose of building the dental restoration.

Referring to the drawings and particularly to FIGURES 1, 2 and 3, 20 indicates a dental impression made in the well known manner by inserting a rubber-like material into the patient's mouth and forcing it against the patient's teeth and gums. It is customary to prepare the teeth and gums of the patient in advance of making the impression as by grinding and trimming to receive the restorations to be made. Thus where caps are to be applied the tooth may be ground down to present sound material for cementing purposes. Where bridge work is to be applied, certain pivot teeth may similarly be prepared.

The impression 20 is secured to a cup 21 which is made of some ferrous material such as sheet iron. A quantity of some suitable tacky substance such as the putty 22, indicated in FIGURE 1, is interposed between the impression and the cup 21. The impression 20 is made with a finger part 23, which is slipped through an opening 24, in the walls 25 of the jig. The base 26 of the jig is provided with a surface of magnetic material 27, such as the well known plastic magnet sheet. When the cup 21 is slipped upon the base 26 the magnetic material 27 secures it in place for subsequent operations.

In the embodiment shown in FIGURES 1, 2 and 3, the wall 25 consists of spaced arcuate members which are swingably secured to posts 28 vertically carried by the base 26. A central bridge-like member 29 is disposed between the post 28 and serves to complete the arcuate path of the walls when they are swung inwardly about the cup 29, in the manner shown in FIGURE 2. The posts 28 are threaded at the upper ends thereof and provided with wing nuts 30, whereby the walls 25 can be tightened into position once they are located.

As shown in FIGURE 3, the walls 25 may also be provided with small metal inserts 31 in the bottom thereof, which inserts are made of ferrous material and will therefore be held by the magnetic layer 27. The top of the walls 25 is provided with a series of spherical spacers 32 which serve to locate dowel holders 33, therebetween.

The dowel holders 33 consist of a somewhat elongated rectangular shaped member preferably made of resilient material such as neoprene, silicone rubber or the like. A small dowel 34 in the nature of an elongated pin is removably carried in one end of the holder 33. The dowel 34 is non-circular in cross-section so that it is maintained in registration during subsequent operations when it is removed from the finished model. The bottom of the dowel 34 is knurled as indicated at 35 in order to improve its holding ability within the model.

After the impression and the cup 21 have been placed upon the base 26 in the manner shown in FIGURE 2, the dowel holder 33 with its depending dowel 34 is secured upon the top of the wall 25 by means of a small wad of putty 36, placed between the spacers 32. The putty 36 holds the dowel holder in place while permitting it to be adjusted prior to the pouring operation. The dowel 34 is disposed in such a manner that the knurled portion 35 extends into the cavities 37, in the impression. At this juncture it is important that the dowels 34 be vertically disposed and parallel with each other so that subsequent removal operations will be facilitated. In this manner, the dowels will be properly oriented even though the cavities representing the patient's teeth may not be parallel with each other as is common in tooth formation.

Each of the cavities 37 in the impression 20 is next filled with a quantity of casting material such as cast stone, epoxy, or the like. During this operation, the entire jig may be vibrated as by placement on a vibrating table (not shown) in order to insure that the stone enters the recesses of deep cavities.

After the stone or cast material has hardened around the dowels 34, a lubricant 38, such as oil, petroleum jelly, or light grease is spread over the surface of the cast material 39. Additional material is cast upon the lubricated surface as shown at 40, in FIGURE 4.

After the cast material 40 has hardened the entire structure is removed from the base 26 and the impression 20 peeled from the lubricated surface resulting in the model and die illustrated in FIGURE 5. The dowels 34 will retain the cast portion within the cavities 37 upon the knurled ends 35 thereof and these portions, representing the prepared teeth of the patient will extend from the main body of the model. At this juncture, the dowel holders 33 may be pulled out of the model leaving openings 41, in the model through which the bottoms of the dowels 34 may be reached. By inserting a tool into the openings 41 and pressing upwardly on the dowels 34, the individual tooth portions can be slipped out of the base of the model. However, before removing the teeth in this manner, it is well to make a series of saw cuts 42, best shown in FIGURES 7 and 8, between the individual tooth members to free them. With the individual tooth members 43 thus removed they can be worked on for the purpose of preparing caps, inlays, and other dental restorations. The non-circular configuration of the dowels 34 insures that the individual teeth members 43 will always be replaced in the identical alignment within the body of the die after they have been worked upon.

In certain dental restorations only a portion of the patient's mouth or only a single tooth may be involved. A device particularly suitable for this purpose and in accordance with the present invention is illustrated in FIGURES 10–13. In this embodiment of the invention the dowel supporting wall 44 is a straight member rather than the arcuate member 25, shown in FIGURES 1 and 2. A base 45 supports the wall 44 and is provided with a plurality of openings 46 therein. A strip of magnetic material 47 is imbeded in the base 45 and underlies the openings 46 as shown. In all other respects the operation of this second embodiment is similar to that of the first except that in place of a full impression 20, a partial impression 48 or a metal band 49, used for individual teeth is employed. In each case, a cup 21 is secured to the impression by means of putty 22, and then placed upon the magnetic strip 47. The dowels 35 are held in place by the dowel holders and several cavities may be filled with casting material at a single pour. The method in which the dowel holders are secured to the top of the wall 44 is identical to that hereinabove described in connection with FIGURES 1, 2 and 3.

From the foregoing it will be seen that there has been provided a dental restoration preparing device capable of a wide variety of applications, which will facilitate the manufacture of dental restorations and improve the accuracy and uniformity thereof.

Having thus fully described the invention, what is claimed as new and desired to be secured by Letters Patent of the United States, is:

1. A dental restoration die fabricating device comprising in combination, a base, a magnetic member upon said base, an upstanding wall secured to said base, a ferrous cup receivable upon the base, means to secure a dental impression upon the cup and means to support a dowel above the dental impression whereby cast material deposited upon the dental impression will take the form of the impression and surround the dowel.

2. A device according to claim 1, in which the wall is formed of arcuate members swingably carried by the base.

3. A device according to claim 1 in which the dowel supporting means are elongated resilient members which are carried by the wall.

4. A device according to claim 1, in which the base is provided with a plurality of spaced openings and the magnetic member underlies the said openings.

References Cited
UNITED STATES PATENTS

| | | | |
|---|---|---|---|
| 1,477,098 | 12/1923 | Balter | 32—18 |
| 3,107,428 | 10/1963 | Freeman | 32—17 |
| 3,277,576 | 10/1966 | Kraft | 32—17 X |

ROBERT PESHOCK, Primary Examiner

U.S. Cl. X.R.

249—93